(12) United States Patent
Nakajima

(10) Patent No.: US 10,554,842 B2
(45) Date of Patent: Feb. 4, 2020

(54) IMAGE PROCESSING APPARATUS WITH BACKUP PROGRAM FOR CONTROLLING DISPLAY DEVICE

(71) Applicant: KYOCERA Document Solutions Inc., Osaka-shi, Osaka (JP)

(72) Inventor: Yoshimasa Nakajima, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 16/277,770

(22) Filed: Feb. 15, 2019

(65) Prior Publication Data

US 2019/0260882 A1 Aug. 22, 2019

(30) Foreign Application Priority Data

Feb. 22, 2018 (JP) ................................. 2018-029485

(51) Int. Cl.
*G06F 15/00* (2006.01)
*G06F 3/12* (2006.01)
*G06K 1/00* (2006.01)
*H04N 1/00* (2006.01)
*G06F 9/4401* (2018.01)

(52) U.S. Cl.
CPC ......... *H04N 1/0097* (2013.01); *G06F 3/1204* (2013.01); *G06F 3/1257* (2013.01); *G06F 9/4401* (2013.01); *H04N 1/00013* (2013.01); *H04N 1/00084* (2013.01); *H04N 1/00326* (2013.01); *H04N 1/00931* (2013.01)

(58) Field of Classification Search
CPC ............. H04N 1/0097; H04N 1/00013; H04N 1/00084; H04N 1/00326; H04N 1/00931; G06F 3/1204; G06F 3/1257; G06F 9/4401
USPC ...................... 358/1.16, 1.1, 1.13, 1.14, 1.15
See application file for complete search history.

(56) References Cited

U.S. PATENT DOCUMENTS

2007/0266202 A1* 11/2007 Mukaida ............... G06F 9/4401
711/103
2014/0365823 A1* 12/2014 Michihata ............. G06F 9/4401
714/16

FOREIGN PATENT DOCUMENTS

JP 2006127554 A 5/2006

* cited by examiner

*Primary Examiner* — Douglas Q Tran
(74) *Attorney, Agent, or Firm* — Alleman Hall Creasman & Tuttle LLP

(57) ABSTRACT

In an image processing apparatus, a processor reads a boot loader from a first storage device, reads a main program from a second storage device by executing the boot loader, and, by executing the main program, transitions to an operation state. The first storage device is mounted on a board on which the processor is mounted. The second storage device is electrically connected with the processor via a bus. When an error occurs during reading of the main program from the second storage device, the processor automatically reads a backup program from the third storage device and displays a screen including warning information on a display device by executing the backup program.

5 Claims, 2 Drawing Sheets

IMAGE PROCESSING APPARATUS WITH BACKUP PROGRAM FOR CONTROLLING DISPLAY DEVICE

INCORPORATION BY REFERENCE

This application is based upon and claims the benefit of priority from the corresponding Japanese Patent Application No. 2018-029485 filed on Feb. 22, 2018, the entire contents of which are incorporated herein by reference.

BACKGROUND

The present disclosure relates to an image processing apparatus that performs processing in case of a program error at a start-up.

An image processing apparatus, such as a printer, a copier or a multifunction peripheral, executes an image processing job such as an image reading process or a print process. The image processing apparatus can execute the job as a CPU (Central Processing Unit) executes a firmware.

The image processing apparatus may include the CPU for executing the firmware, a semiconductor storage device that stores the firmware in advance, and a disk-type storage device. The CPU performs writing and reading of image data to/from the disk-type storage device.

In general, the semiconductor storage device has a faster data reading speed than the disk-type storage device. A typical example of the semiconductor storage device is a NOR flash memory or a NAND flash memory. In addition, a typical example of the disk-type storage device is a hard disk drive.

The firmware includes a boot loader and a main program, wherein the CPU executes the boot loader first and then the main program.

By executing the main program, the CPU controls a display device and devices that execute the job.

In the image processing apparatus, the size of the firmware changes depending on the difference in model and presence/absence of an optional function(s). As a result, the firmware may be stored in a storage device, such as an SSD (Solid State Drive), that is connected to the CPU via a bus.

In addition, there is known a technology in which normally, the CPU executes the boot process based on a program stored in a flash ROM, and when energization is started in a state where a predetermined switch is operated, the CPU executes the boot process based on a program stored in an IC card.

SUMMARY

An image processing apparatus according to an aspect of the present disclosure includes a job processing device, a display device, a first storage device, a second storage device, a third storage device, and a processor. The job processing device executes an image processing job that includes either or both of an image reading process and a print process. The first storage device is a nonvolatile storage device that stores, in advance, a boot loader that is a part of a firmware. The second storage device is a nonvolatile storage device that stores, in advance, a main program that is another part of the firmware and controls the display device and the job processing device. The third storage device is a nonvolatile storage device to and from which image data used in the image processing job is written and read, and which is configured to store, in advance, a backup program that includes a program for controlling the display device. The processor reads the boot loader from the first storage device, reads the main program from the second storage device by executing the boot loader, and, by executing the main program, transitions to an operation state in which to control the display device and the job processing device. The first storage device is mounted on a board on which the processor is mounted. The second storage device is electrically connected with the processor via a bus. When an error occurs during reading of the main program from the second storage device, the processor automatically reads the backup program from the third storage device and displays a graphic screen including warning information on the display device by executing the backup program.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

[Configuration of Image Processing Apparatus 10]

An image processing apparatus 10 according to an embodiment of the present disclosure executes image processing jobs such as an image reading process and a print process.

In the image reading process, an image is read from a document sheet 91 and image data representing the read image is output. In the print process, an image is formed on a sheet 92. For example, the image processing apparatus 10 may be a printer, a copier, or a multifunction peripheral.

Figure 1:
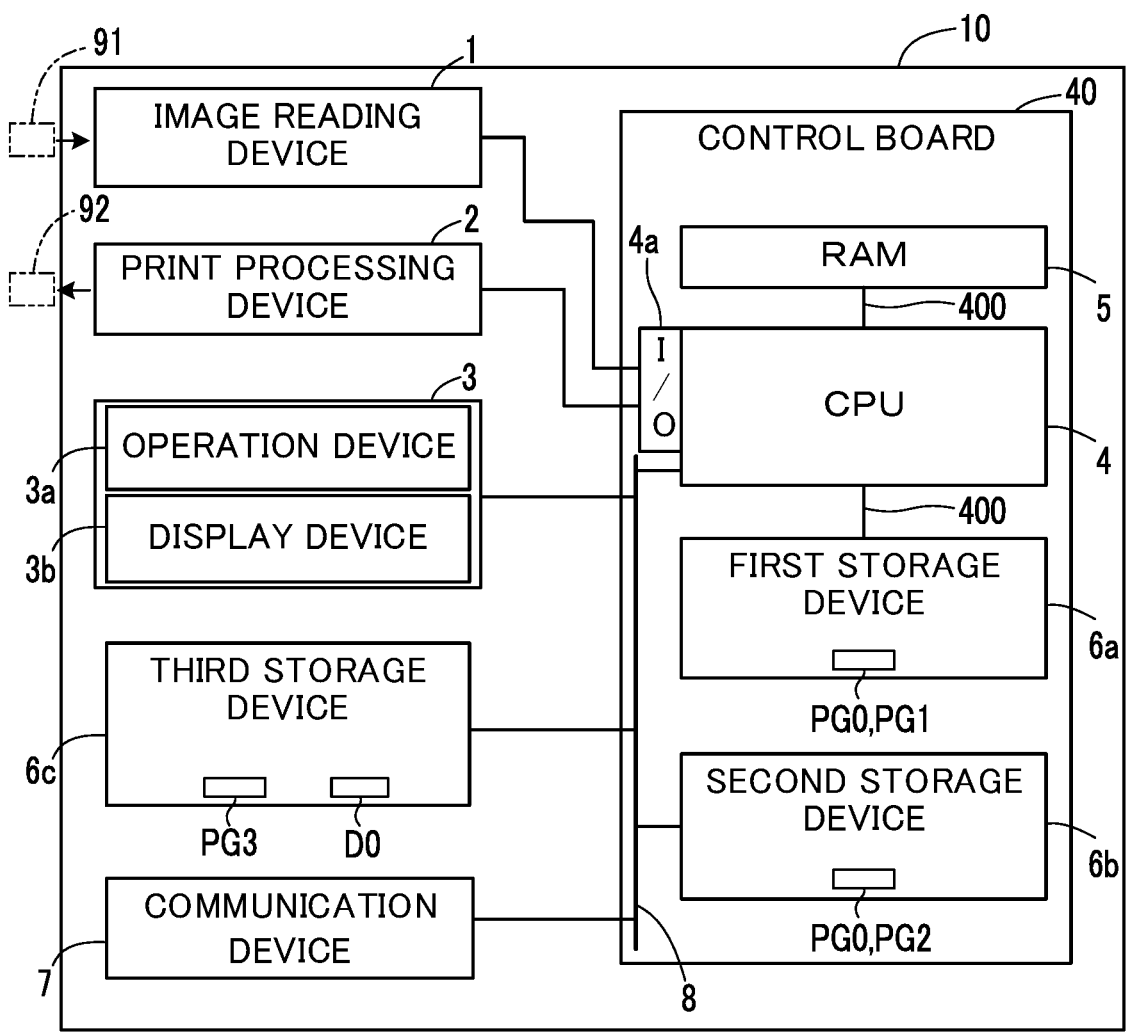
FIG. 1 is a block diagram of an image processing apparatus according to an embodiment of the present disclosure.

The image processing jobs include, for example, an image transmission job, a print job, and a copy job. As shown in FIG. 1, the image processing apparatus 10 is a multifunction peripheral that can execute the image transmission job, the print job, and the copy job.

The image transmission job includes the image reading process and a process of transmitting, to another apparatus, the image data obtained in the image reading process. The print job includes a process of receiving print data from another apparatus, a process of converting the print data into image data for printing, and the print process executed based on the image data. The copy job includes the image reading process and the print process executed based on image data obtained in the image reading process.

As shown in FIG. 1, the image processing apparatus 10 includes an image reading device 1, a print processing device 2, a user interface unit 3, a CPU 4, a RAM 5, a first storage device 6a, a second storage device 6b, a third storage device 6c, and a communication device 7.

The image reading device 1 executes the image reading process. The image reading device 1 emits light toward the document sheet 91, receives light reflected from the document sheet 91, and detects an amount of received light. Furthermore, the image reading device 1 outputs data of the detected amount of received light as image data representing a read image.

The print processing device 2 executes the print process by a predetermined system such as an electrophotographic system or an inkjet system. The sheet 92 is a sheet-like image formation medium such as a sheet of paper or a resin film.

The communication device 7 is a communication interface device configured to perform a communication with another apparatus, such as an information processing apparatus (not shown), via a communication medium such as an electric wave or a communication cable. The CPU 4 performs all of data transmissions and receptions to/from the other apparatus via the communication device 7.

A combination of the image reading device 1 and the communication device 7 is an example of a job processing device that executes the image transmission job. A combination of the print processing device 2 and the communication device 7 is an example of a job processing device that executes the print job. A combination of the image reading device 1 and the print processing device 2 is an example of a job processing device that executes the copy job.

In the image transmission job, the CPU 4 performs a process of writing image data D0 as a transmission target to the third storage device 6c and a process of reading the image data D0 from the third storage device 6c.

Similarly, in the print job, the CPU 4 performs a process of writing print data received from the other apparatus or image data D0 used in the print process to the third storage device 6c and a process of reading the print data or the image data D0 from the third storage device 6c.

Similarly, in the copy job, the CPU 4 performs a process of writing image data D0 for printing obtained by the image reading device 1 to the third storage device 6c and a process of reading the image data D0 from the third storage device 6c.

The user interface unit 3 includes an operation device 3a and a display device 3b. The operation device 3a is configured to receive user operations and includes, for example, a touch panel. The display device 3b is configured to display an image and includes a display panel such as a liquid crystal display panel.

The RAM 5 is a volatile storage device. The RAM 5 primarily stores: a program(s) executed by the CPU 4; and data that is output and consulted by the CPU 4 during an execution of the program(s). The program(s) includes a firmware PG0.

The first storage device 6a, the second storage device 6b, and the third storage device 6c are computer-readable non-volatile storage devices. The first storage device 6a and the second storage device 6b are semiconductor storage devices. The third storage device 6c is a disk-type storage device.

In the present embodiment, the first storage device 6a is a NOR flash memory, the second storage device 6b is an SSD (Solid State Drive), and the third storage device 6c is an HDD (Hard Disk Drive). The firmware PG0 is divided in two and stored in the first storage device 6a and the second storage device 6b. The SSD is an example of a NAND flash memory.

The first storage device 6a has a faster data reading speed than the second storage device 6b. In general, the NOR flash memory has a faster data reading speed than the NAND flash memory such as the SSD.

In addition, the second storage device 6b has a faster data reading speed than the third storage device 6c. In general, the semiconductor storage devices such as the NOR flash memory and the SSD have faster data reading speeds than the disk-type storage device such as the HDD.

The CPU 4 controls the image reading device 1 and the print processing device 2 by executing the firmware PG0. As shown in FIG. 1, the CPU 4 includes a signal input/output interface 4a.

The CPU 4 is electrically connected with the image reading device 1 and the print processing device 2 via the signal input/output interface 4a.

The CPU 4 receives inputs of detection signals of various sensors from the image reading device 1 and the print processing device 2 via the signal input/output interface 4a. Furthermore, the CPU 4 outputs control signals to the image reading device 1 and the print processing device 2 via the signal input/output interface 4a.

In addition, the CPU 4 is electrically connected with the user interface unit 3, the second storage device 6b, the third storage device 6c, and the communication device 7 via a bus 8. The CPU 4 exchanges data with the second storage device 6b, the third storage device 6c, and the communication device 7 via the bus 8.

The first storage device 6a is mounted on a control board 40, together with the CPU 4 and the RAM 5. The RAM 5 and the first storage device 6a are electrically connected with the CPU 4 by a pattern wiring 400 formed on the control board 40. The CPU 4 exchanges data with the RAM 5 and the first storage device 6a via the pattern wiring 400.

It is noted that another processor such as a DSP (Digital Signal Processor) or an MPU (Micro Processing Unit) may be adopted in place of the CPU 4.

The firmware PG0 includes a boot loader PG1 and a main program PG2, wherein the CPU 4 executes the boot loader PG1 first and then the main program PG2. The boot loader PG1 controls the loading of the main program PG2.

By executing the main program PG2, the CPU 4 controls and causes the display device 3b, the image reading device 1, and the print processing device 2 to execute the job.

In the image processing apparatus 10, the size of the firmware PG0 changes depending on the difference in model and presence/absence of an optional function(s). As a result, in the present embodiment, the boot loader PG1 that is a part of the firmware PG0 is stored in the first storage device 6a, and the main program PG2 that is the remaining part of the firmware PG0 is stored in the second storage device 6b.

The main program PG2 is larger than the boot loader PG1 in program size. As a result, the second storage device 6b has a larger storage capacity than the first storage device 6a. In addition, the third storage device 6c that stores image data has a larger storage capacity than the first storage device 6a and the second storage device 6b.

The boot loader PG1 has a low dependency on the difference in model and presence/absence of an optional function(s), and is a program that is common to many models of the image processing apparatus 10. The content and size of the main program PG2 change depending on the difference in model of the image processing apparatus 10 and presence/absence of an optional function(s).

Meanwhile, the second storage device 6b is electrically connected with the CPU 4 via the bus 8. The CPU 4 exchanges data with the second storage device 6b via the bus 8. In this case, a data error occurs in the second storage device 6b more easily than in a case where the second storage device 6b is mounted on the control board 40 together with the CPU 4, due to dust entering a terminal or due to an influence from other devices connected with the bus 8.

In other words, the first storage device 6a that is mounted on the control board 40 together with the CPU 4, has hardly a data error due to dust or the like.

In addition, in a case where a memory element, such as an IC card, that can be attached to the image processing apparatus 10 in a detachable manner by a user, is adopted as a storage device for storing the firmware PG0 as a backup, the user needs to manage the memory element. However, the state where the user needs to manage the firmware PG0 is not preferable since it degrades the usability.

In addition, providing an additional storage device only for handling the data error is not preferable in terms of cost.

As described above, the second storage device 6b storing the main program PG2 is an SSD that is connected to the CPU 4 via the bus 8. As a result, in the image processing apparatus 10, it is possible to adopt, as the second storage device 6b, an apparatus whose specifications, such as the capacity, change depending on the content of the main program PG2 of the firmware PG0.

Furthermore, in the image processing apparatus 10, a backup program PG3 corresponding to the main program PG2 is stored in the third storage device 6c in advance, and the CPU 4 executes a start-up control that is described below. With this configuration, without an additional dedicated device, the image processing apparatus 10 can automatically execute a process in case a data error occurs in the second storage device 6b.

The backup program PG3 includes at least a program for controlling the display device 3b. Specifically, the backup program PG3 includes a control program that displays a graphic screen on the display device 3b.

As described below, when an error occurs during reading of the main program PG2 from the second storage device 6b, the CPU 4 executes the backup program PG3.

For example, the backup program PG3 may cause the CPU 4 to perform a control to display a screen that explains the status of the image processing apparatus 10 on the display device 3b, and to display various explanation screens in response to operations performed on the operation device 3a.

[Start-Up Control]

Figure 2:
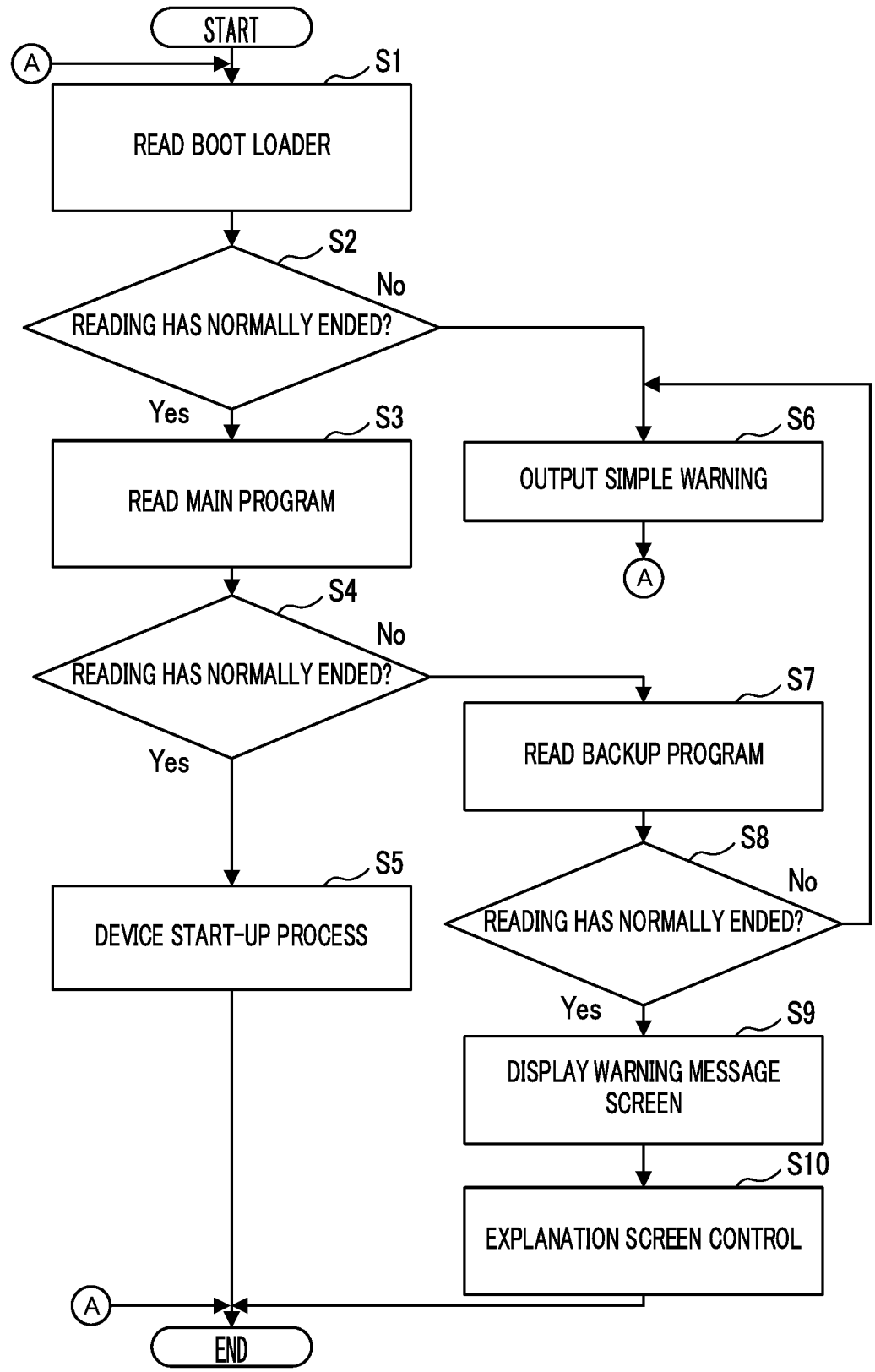
FIG. 2 is a flowchart showing an example of a procedure of a start-up control performed in the image processing apparatus according to the embodiment.

The following describes an example of a procedure of the start-up control performed by the CPU 4 with reference to a flowchart shown in FIG. 2.

The CPU 4 performs the start-up control when energization is started or when a predetermined reset operation is performed on the operation device 3a. In the following description, S1, S2, . . . are identification signs representing a plurality of steps of the start-up control.

<Step S1>

In the start-up control, first, the CPU 4 reads the boot loader PG1 from the first storage device 6a, and expands the read boot loader PG1 in the RAM 5.

<Step S2>

Furthermore, the CPU 4 determines whether or not the reading of the boot loader PG1 has normally ended, by executing a well-known error detection process such as a parity check.

Upon determining that the reading of the boot loader PG1 has normally ended, the CPU 4 moves the process to step S3, and otherwise, moves the process to step S6.

<Step S3>

In step S3, the CPU 4 executes the boot loader PG1 to read the main program PG2 from the second storage device 6b, and expand the read main program PG2 in the RAM 5.

<Step S4>

In step S4, the CPU 4 determines whether or not the reading of the main program PG2 has normally ended, by executing a well-known error detection process.

Upon determining that the reading of the main program PG2 has normally ended, the CPU 4 moves the process to step S5, and otherwise, moves the process to step S7.

<Step S5>

In step S5, the CPU 4 executes the main program PG2, and thereby transitions to an operation state in which it is possible to control the display device 3b, the image reading device 1, the print processing device 2, and the communication device 7. Thereafter, the CPU 4 executing the main program PG2 ends the start-up process.

<Step S6>

In step S6, the CPU 4 executes a simple warning output process by executing the boot loader PG1. Thereafter, the CPU 4 executing the boot loader PG1 ends the start-up control.

In the simple warning output process, a text screen including a predetermined warning message is displayed on the display device 3b.

The text screen includes only text in a single color, without a graphic display. In addition, the single-color text included in the text screen is written in a basic language that has been set initially. The basic language is, for example, English, and cannot be selected by the user.

<Step S7>

In step S7, the CPU 4 reads the backup program PG3 from the third storage device 6c by executing the boot loader PG1, and expands the read backup program PG3 in the RAM 5.

<Step S8>

In step S8, the CPU 4 determines whether or not the reading of the backup program PG3 has normally ended, by executing a well-known error detection process.

Upon determining that the reading of the backup program PG3 has normally ended, the CPU 4 moves the process to step S9, and otherwise, moves the process to step S6. Accordingly, the CPU 4 executing the boot loader PG1 executes the simple warning output process also when it has failed to read both the main program PG2 and the backup program PG3.

<Step S9>

In step S9, the CPU 4 displays a predetermined warning message screen on the display device 3b by executing the backup program PG3.

The warning message screen is a graphic screen including a message that represents predetermined warning information. In addition, the message of the warning information is written in a predetermined language that is selected beforehand by the user of the image processing apparatus 10.

For example, the warning information includes an explanation that an error has occurred during a process of reading the main program PG2 from the second storage device 6b, and includes an explanation of an operation that is recommended to fix the error.

The recommended operation is, for example, an operation to reset the image processing apparatus 10, or an operation to restart the image processing apparatus 10 after temporarily cutting off the power supply to the image processing apparatus 10.

The user who has confirmed the warning message screen will recognize that the user himself/herself may normally start up the image processing apparatus 10.

<Step S10>

Furthermore, the CPU 4 executing the backup program PG3 performs an explanation screen control to display one of various types of explanation screens in accordance with an operation performed on the operation device 3*a*.

The explanation screen is a graphic screen including either or both of an explanation of details of the state of the image processing apparatus 10, and an explanation of an action to be taken when the error is not fixed by the recommended operation.

The CPU 4 executing the backup program PG3 ends the start-up control when it detects a predetermined ending operation performed on the operation device 3*a*. When an error occurs during reading of the main program PG2 from the second storage device 6*b*, the CPU 4 automatically executes the above-described processes of steps S7 to S10.

In the image processing apparatus 10 described above, the third storage device 6*c* based on a known technology serves as a storage for storing image data and a storage for storing the backup program PG3. This allows the image processing apparatus 10 to automatically execute a process for handling a data error that occurs in the second storage device 6*b*, without adding a dedicated device (steps S7 to S10).

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image processing apparatus comprising:
   a job processing device configured to execute an image processing job that includes either or both of an image reading process and a print process;
   a display device;
   a nonvolatile first storage device configured to store, in advance, a boot loader that is a part of a firmware;
   a nonvolatile second storage device configured to store, in advance, a main program that is another part of the firmware and controls the display device and the job processing device;
   a nonvolatile third storage device to and from which image data used in the image processing job is written and read, and which is configured to store, in advance, a backup program that includes a program for controlling the display device; and
   a processor configured to read the boot loader from the first storage device, read the main program from the second storage device by executing the boot loader, and, by executing the main program, transition to an operation state in which to control the display device and the job processing device, wherein
   the first storage device is mounted on a board on which the processor is mounted,
   the second storage device is electrically connected with the processor via a bus, and
   when an error occurs during reading of the main program from the second storage device, the processor automatically reads the backup program from the third storage device and displays a graphic screen including warning information on the display device by executing the backup program.

2. The image processing apparatus according to claim 1, wherein
   the first storage device has a faster data reading speed than the second storage device, and
   the second storage device has a faster data reading speed than the third storage device.

3. The image processing apparatus according to claim 1, wherein
   the second storage device has a larger storage capacity than the first storage device, and
   the third storage device has a larger storage capacity than the second storage device.

4. The image processing apparatus according to claim 1, wherein
   the first storage device and the second storage device are semiconductor storage devices, and
   the third storage device is a disk-type storage device.

5. The image processing apparatus according to claim 4, wherein
   the first storage device is a NOR flash memory, the second storage device is a NAND flash memory, and the third storage device is a hard disk drive.

* * * * *